(12) United States Patent
Hosseini et al.

(10) Patent No.: US 12,250,084 B2
(45) Date of Patent: *Mar. 11, 2025

(54) PARAMETER DETERMINATION FOR USER EQUIPMENT

(71) Applicant: QUALCOMM Incorporated, San Diego, CA (US)

(72) Inventors: Seyedkianoush Hosseini, San Diego, CA (US); Wei Yang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,543

(22) Filed: Sep. 7, 2023

(65) Prior Publication Data

US 2024/0072946 A1     Feb. 29, 2024

Related U.S. Application Data

(63) Continuation of application No. 17/249,200, filed on Feb. 23, 2021, now Pat. No. 11,791,950.

(Continued)

(51) Int. Cl.
*H04L 1/1867*     (2023.01)
*H04L 1/1812*     (2023.01)
(Continued)

(52) U.S. Cl.
CPC .......... *H04L 1/1887* (2013.01); *H04L 1/1812* (2013.01); *H04L 1/1896* (2013.01); *H04W 72/0446* (2013.01); *H04W 72/23* (2023.01)

(58) Field of Classification Search
CPC ... H04L 1/1887; H04L 1/1812; H04L 1/1896; H04L 1/1861; H04L 1/1825; H04L 1/1854; H04W 72/0446; H04W 72/23
See application file for complete search history.

(56) References Cited

U.S. PATENT DOCUMENTS 11,791,950 B2    10/2023  Hosseini et al.
2021/0144688 A1*  5/2021  Lin ................. H04L 1/1812

FOREIGN PATENT DOCUMENTS

| CN | 109639398 A | 4/2019 |
| CN | 110166180 A | 8/2019 |
| CN | 110692277 A | 1/2020 |

OTHER PUBLICATIONS

International Search Report and Written Opinion—PCT/US2021/070186—ISA/EPO—May 12, 2021.

(Continued)

*Primary Examiner* — Vinncelas Louis
(74) *Attorney, Agent, or Firm* — Harrity & Harrity, LLP

(57) ABSTRACT

Various aspects of the present disclosure generally relate to wireless communication. In some aspects, a user equipment (UE) may determine a set of parameters for generating a hybrid automatic repeat request (HARD)-acknowledgement (ACK) codebook associated with a particular downlink control information (DCI) format of a plurality of DCI formats, wherein the particular DCI format is associated with a particular priority of a plurality of priorities; and generate the HARQ-ACK codebook based at least in part on the set of parameters. Numerous other aspects are provided.

30 Claims, 4 Drawing Sheets

Related U.S. Application Data

(60) Provisional application No. 62/981,931, filed on Feb. 26, 2020.

(51) Int. Cl.
*H04W 72/0446* (2023.01)
*H04W 72/23* (2023.01)

(56) References Cited

OTHER PUBLICATIONS

OPPO: "Summary#1 on UCI Enhancements for R16 URLLC", 3GPP Draft, 3GPP TSG RAN WG1 #100-e, R1-2001016, 3rd Generation Partnership Project (3GPP), Mobile Competence Centre; 650, Route Des Lucioles; F-06921, Sophia-Antipolis Cedex; France, vol. RAN WG1, No. , e-Meeting, Feb. 24, 2020-Mar. 6, 2020, Feb. 17, 2020 (Feb. 17, 2020), XP051853637, 51 pages, p. 2-p. 3 pp. 21, 33.

* cited by examiner

PARAMETER DETERMINATION FOR USER EQUIPMENT

CROSS-REFERENCE TO RELATED APPLICATION

This patent application is a continuation of U.S. Non-Provisional application Ser. No. 17/249,200, filed on Feb. 23, 2021, entitled "PARAMETER DETERMINATION FOR USER EQUIPMENT", which claims priority to U.S. Provisional Patent Application No. 62/981,931, filed on Feb. 26, 2020, entitled "PARAMETER DETERMINATION FOR USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for parameter determination for user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a set of parameters for generating a hybrid automatic repeat request (HARD)-acknowledgement (ACK) codebook associated with a particular downlink control information (DCI) format of a plurality of DCI formats, wherein the particular DCI format is associated with a particular priority of a plurality of priorities; and generating the HARQ-ACK codebook based at least in part on the set of parameters.

In some aspects, a UE for wireless communication includes a memory; and one or more processors operatively coupled to the memory, the memory and the one or more processors configured to: determine a set of parameters for generating a HARQ-ACK codebook associated with a particular DCI format of a plurality of DCI formats, wherein the particular DCI format is associated with a particular priority of a plurality of priorities; and generate the HARQ-ACK codebook based at least in part on the set of parameters.

In some aspects, a non-transitory computer-readable medium storing a set of instructions for wireless communication includes one or more instructions that, when executed by one or more processors of a UE, cause the UE to: determine a set of parameters for generating a HARQ-ACK codebook associated with a particular DCI format of a plurality of DCI formats, wherein the particular DCI format is associated with a particular priority of a plurality of priorities; and generate the HARQ-ACK codebook based at least in part on the set of parameters.

In some aspects, an apparatus for wireless communication includes means for determining a set of parameters for generating a HARQ-ACK codebook associated with a particular DCI format of a plurality of DCI formats, wherein the particular DCI format is associated with a particular priority of a plurality of priorities; and means for generating the HARQ-ACK codebook based at least in part on the set of parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
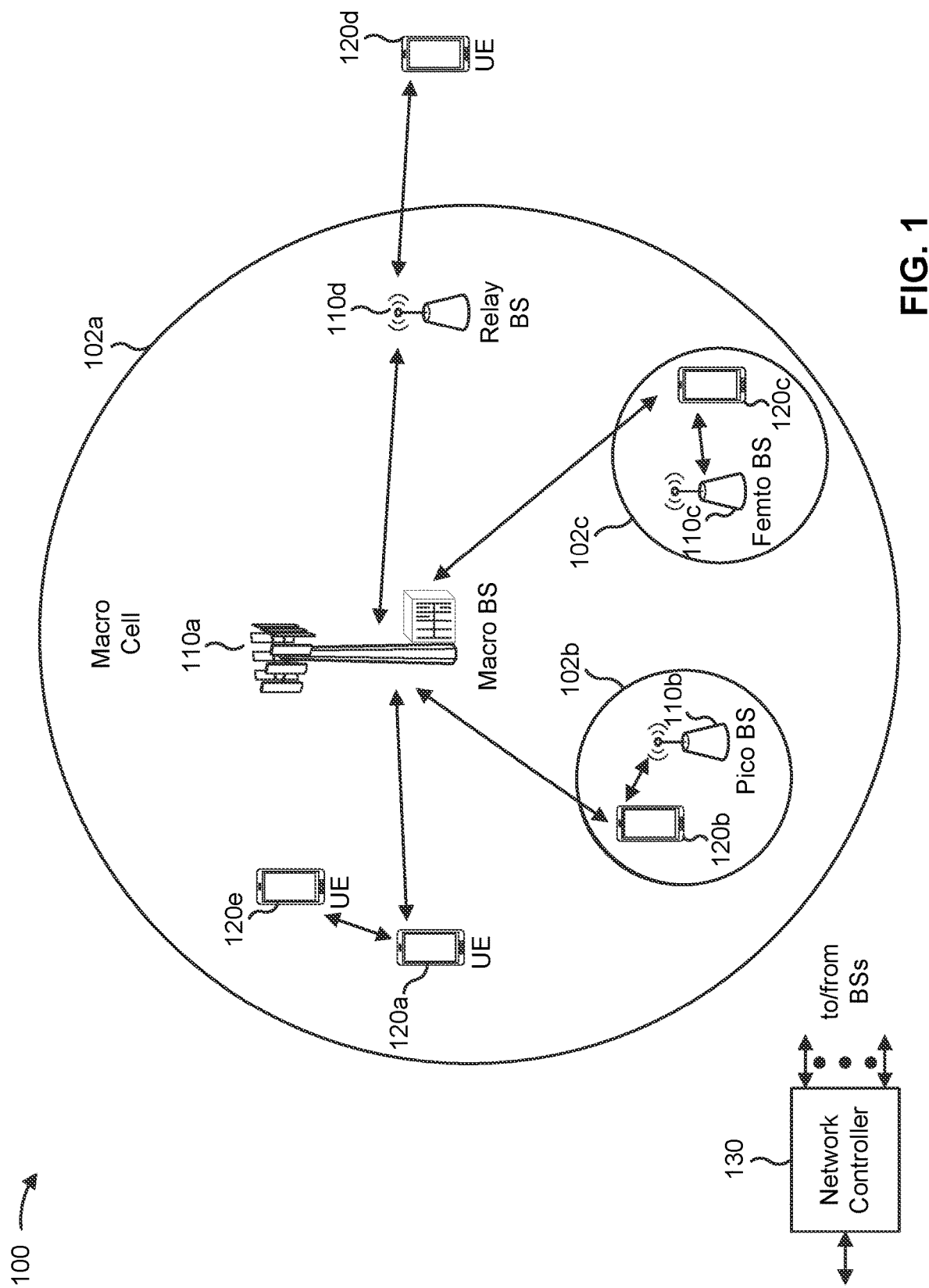
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
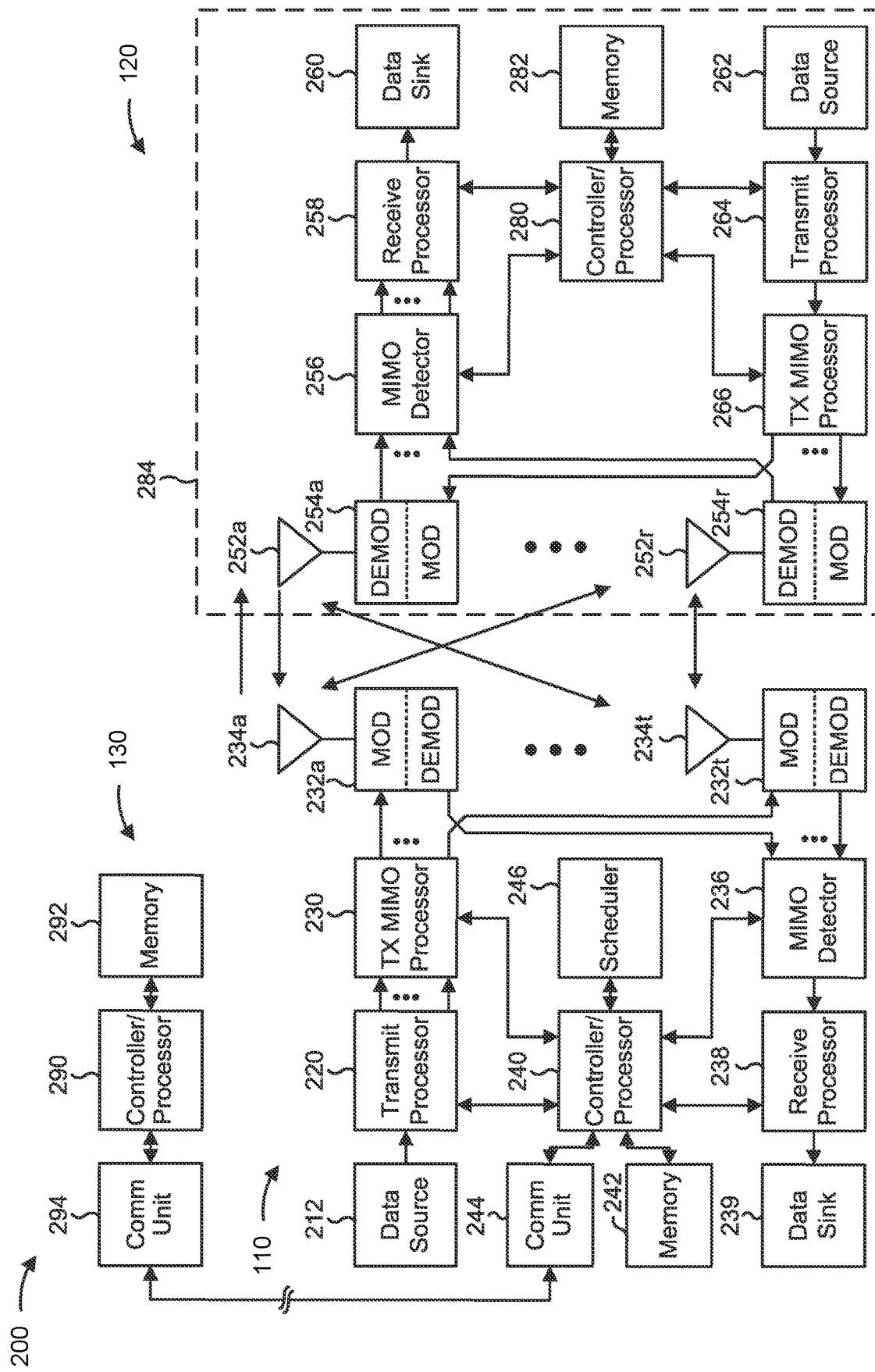
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3 and 4.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3 and 4.

Controller/processor 240 of base station 110, controller/processor 280 of UE 120, and/or any other component(s) of FIG. 2 may perform one or more techniques associated with parameter determination for UEs, as described in more detail elsewhere herein. For example, controller/processor 240 of base station 110, controller/processor 280 of UE 120, and/or any other component(s) of FIG. 2 may perform or direct operations of, for example, process 300 of FIG. 3 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 300 of FIG. 3 and/or other processes as described herein. In some aspects, executing instructions may include running the instructions, converting the instructions, compiling the instructions, and/or interpreting the instructions, among other examples.

In some aspects, UE 120 may include means for determining a set of parameters for generating a hybrid automatic repeat request (HARD)-acknowledgement (ACK) codebook associated with a particular downlink control information (DCI) format of a plurality of DCI formats, wherein the particular DCI format is associated with a particular priority of a plurality of priorities; and means for generating the HARQ-ACK codebook based at least in part on the set of parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, a UE can be configured to monitor multiple DCI formats on a given carrier. For example, in an NR system, a UE can be configured to monitor both DCI format type 1-1 and DCI format type 1-2 on a given carrier. In some deployments, a downlink grant of each of the configured DCI formats (e.g., DCI scheduling a downlink communication, such as a physical downlink shared channel (PDSCH) communication) can indicate a HARQ-ACK codebook of either a low priority (e.g., priority 0) or a high priority (e.g., priority 1) dynamically, where the indicated HARQ-ACK codebook is to be used in association with a transmission of HARQ-ACK information (e.g., an ACK, a negative ACK (NACK), or the like) to be transmitted by the UE after the UE attempts to receive a downlink communication (e.g., a PDSCH communication). Generally, the UE generates one or more HARQ-ACK codebooks to be used in this manner.

In some cases, the UE is configured to generate a HARQ-ACK codebook based at least in part on a set of parameters. For example, the UE may be configured to generate a HARQ-ACK codebook based at least in part on a set of PDSCH-to-HARQ timing indicator values (herein referred to as $K_1$ values) and candidate PDSCH occasions. The determination of these parameters depends upon which DCI formats that the UE is configured to monitor. For example, when a UE is configured to monitor both DCI format type 1-1 and DCI format type 1-2, the UE may be configured to determine the set of $K_1$ values based at least in part on a union set of information in a dl-DataToUL-ACK for DCI format type 1-1 and information in a dl-DataToUL-ACK-ForDCIFormat1_2-r16 for DCI format type 1-2. Similarly, the UE may be configured to determine the candidate PDSCH occasions based at least in part on a union of a first set of row indices and a second set of row indices of a pdsch-TimeDomainAllocationList in a pdsch-Config and a third set of row indices of a pdsch-TimeDomainAllocation-ListForDCI-Format1_2-R16 in a pdsch-Config.

In some scenarios, a given DCI format may be configured such that the given DCI format can map to a HARQ-ACK codebook of only one priority (e.g., either low priority or high priority). For example, for DCI format type 1-2, a priority field may in some cases not be configured (i.e., DCI of DCI format type 1-2 may not include a field used to indicate a HARQ-ACK codebook priority). In this example, any PDSCH communication scheduled by DCI format type 1-2 may by default have its HARQ-ACK information mapped to a low priority HARQ-ACK codebook. Notably, in this example, DCI format type 1-2 cannot dynamically indicate HARQ-ACK codebook priority. As another example, a UE may not support a dynamic change of priority with a single DCI when both DCI format type 1-1 and DCI format type 1-2 are configured. In such a case, the UE may be configured such that DCI format type 1-1 is always associated with a low priority HARQ-ACK codebook and DCI format type 1-2 is always associated with a high priority HARQ-ACK codebook. In these situations in which a given DCI format can map to only a HARQ-ACK codebook of only one priority, a payload of HARQ-ACK information may be unnecessarily large in size when a HARQ-ACK codebook based upon which the HARQ-ACK is transmitted is generated based upon information associated with a DCI format that cannot be used to indicate the HARQ-ACK codebook. This unnecessarily large payload size may result in wasted network resources, wasted processing resources, and can also degrade performance of the communication system. Such resource waste and performance degradation may be particularly undesirable in, for example, a system that supports ultra-reliable low-latency communications (URLLC).

Some aspects described herein provide techniques and apparatuses for determining a set of parameters associated with generation of a HARQ-ACK codebook. In some aspects, a UE may determine a set of parameters for generating a HARQ-ACK codebook associated with a particular DCI format, where the particular DCI format is associated with a particular priority (e.g., a single priority—either low priority or high priority). Here, the UE may generate the HARQ-ACK codebook based at least in part on the set of parameters. The UE may then receive DCI, of the particular DCI format, scheduling a PDSCH communication, and may transmit HARQ-ACK information associated with the PDSCH communication according to the HARQ-ACK codebook. Additional details are provided below.

Figure 3:
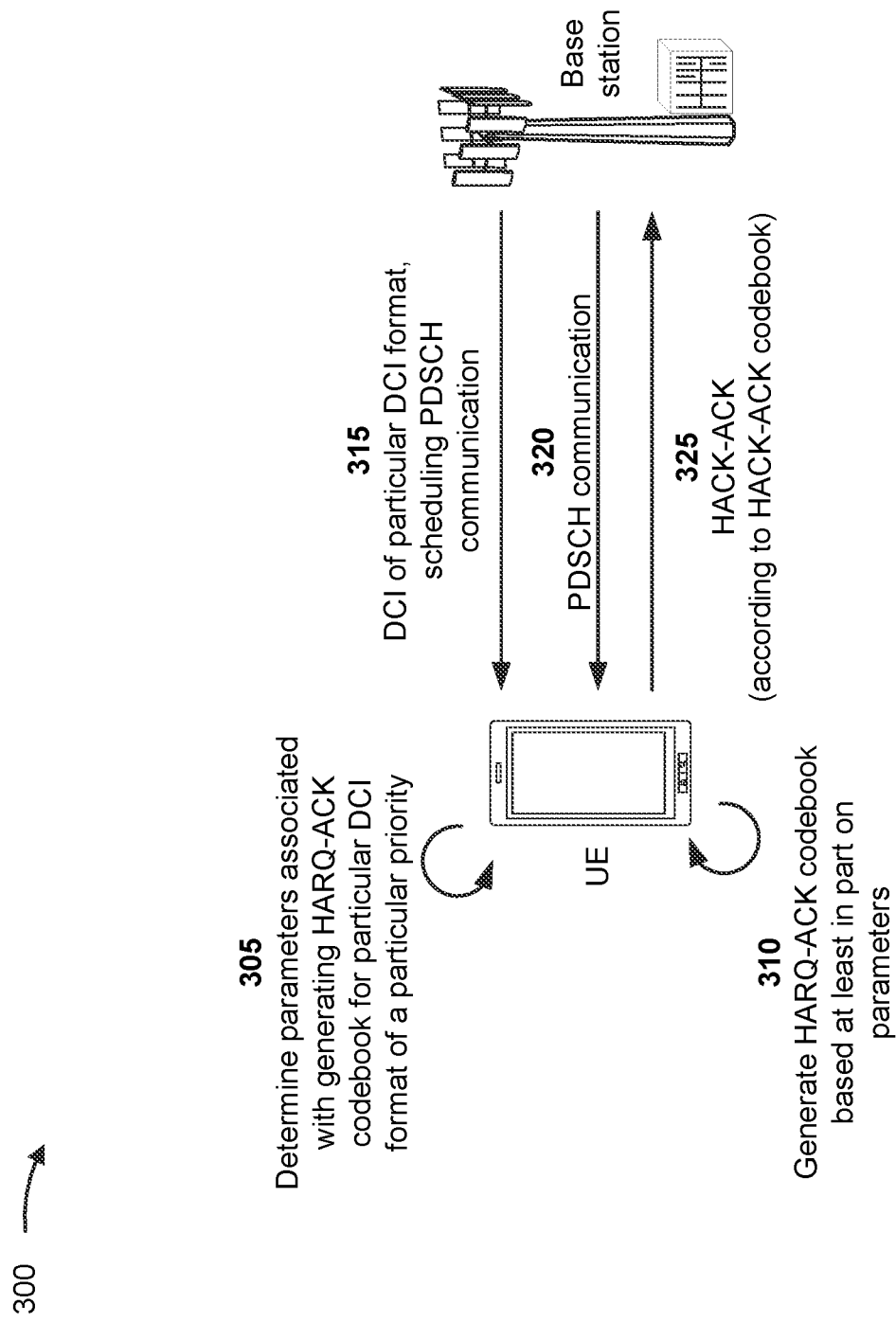
FIG. 3 is a diagram illustrating an example of parameter determination for a UE, in accordance with the present disclosure.

FIG. 3 is a diagram illustrating an example 300 associated with parameter determination for a UE, in accordance with the present disclosure. As shown in FIG. 3, a base station 110 and a UE 120 may communicate with one another.

As show by reference number 305, the UE may determine a set of parameters for generating a HARQ-ACK codebook associated with a particular DCI format associated with a particular priority. In this example, the particular DCI format can map to a HARQ-ACK codebook of only one priority. That is, the particular DCI format may be configured such that the particular DCI format can (explicity or implicitly) indicate only a single priority. This single priority indication may be the case due to, for example, a network configuration or based at least in part on the UE not supporting dynamic change of priority with a single DCI, among other examples.

In some aspects, the particular DCI format may be DCI format type 1-1. In some aspects, the particular DCI format may be DCI format type 1-2. In some aspects, the particular DCI format may be a format other than DCI format type 1-1 or DCI format type 1-2. In some aspects, the DCI format may be one of a plurality of DCI formats configured on the UE. That is, in some aspects, the UE is configured to monitor a physical downlink control channel (PDCCH) with multiple DCI formats, and the particular DCI may be one of the multiple DCI formats for which the UE is configured to monitor a PDCCH. As a particular example, the UE may in some aspects be configured to monitor DCI format type 1-1 and DCI format type 1-2.

In some aspects, the particular priority may be a low priority. In some aspects, the particular priority may be a high priority. In some aspects, the particular priority may be one of a plurality of priority configurations for DCI formats that can be configured on the UE.

In some aspects, the set of parameters includes one or more parameters associated with PDSCH communications that can be scheduled using the particular DCI format. For example, in some aspects, the set of parameters may include time domain resource allocation (TDRA) information. As another example, the set of parameters may include a set of $K_1$ values (i.e., PDSCH-to-HARQ timing indicator values). As another example, the set of parameters may include candidate PDSCH occasions (e.g., information associated with timing of candidate PDSCH occasions).

In some aspects, the particular DCI format may be DCI format type 1-1, and the particular priority may be a low priority. Here, the set of parameters may include, for example, a set of $K_1$ values configured based at least in part on a downlink data to uplink acknowledgement parameter (e.g., a dl-DataToUL-ACK parameter). As another example, the set of parameters may include a set of row indices for PDSCH occasions that is a union of a first set of row indices and a second set of row indices of a PDSCH time domain allocation list message of a PDSCH configuration message (e.g., a pdsch-TimeDomainAllocationList in a pdsch-Config).

In some aspects, the particular DCI format may be DCI format type 1-2, and the particular priority may be a low priority. Here, the set of parameters may include, for example, a set of $K_1$ values configured based at least in part on a downlink data to uplink acknowledgement for DCI format type 1-2 parameter (e.g., a dl-DataToUL-ACK-ForDCIFormat1_2-r16 parameter). As another example, the set of parameters may include a set of row indices for PDSCH occasions that is a union of a first set of row indices and a second set of row indices of a PDSCH time domain allocation list for a DCI format type 1-2 message of a PDSCH configuration message (e.g., a pdsch-TimeDomainAllocationListForDCI-Format1-2-r16 in a pdsch-Config).

In some aspects, the particular DCI format may be DCI format type 1-1, and the particular priority may be a high priority. Here, the set of parameters may include a set of $K_1$ values configured based at least in part on a downlink data to uplink acknowledgement parameter (e.g., a dl-DataToUL-ACK parameter). As another example, the set of parameters may include a set of row indices for PDSCH occasions that is a union of a first set of row indices and a second set of row indices of a PDSCH time domain allocation list message of a PDSCH configuration message (e.g., a pdsch-TimeDomainAllocationList in a pdsch-Config).

In some aspects, the particular DCI format may be DCI format type 1-2, and the particular priority may be a high priority. Here, the set of parameters may include a set of $K_1$ values configured based at least in part on a downlink data to uplink acknowledgement for DCI format type 1-2 parameter (e.g., a dl-DataToUL-ACK-ForDCIFormat1_2-r16parameter). As another example, the set of parameters may include a set of row indices for PDSCH occasions that is a union of a first set of row indices and a second set of row indices of a PDSCH time domain allocation list for a DCI format type 1-2 message of a PDSCH configuration message (e.g., a pdsch-TimeDomainAllocationListForDCI-Format1-2-r16 in a pdsch-Config).

Notably, in the example aspects described herein, the UE determines a given parameter in the set of parameters based at least in part on information associated with the particular DCI format associated with the particular priority (rather than based at least in part on information associated with multiple DCI formats configured on the UE). For example, the UE may be configured to monitor DCI format type 1-1 and DCI format type 1-2 as described above. Here, for a type-1 HARQ-ACK codebook configured for low priority with a DCI format type 1-1 indicating a low priority, the UE may determine the set of $K_1$ values based at least in part on information in a dl-DataToUL-ACK (rather than the union set of information in the dl-DataToUL-ACK for DCI format type 1-1 and information in a dl-DataToUL-ACK-ForDCI-Format1_2-r16 for DCI format type 1-2). Similarly, for a type-1 HARQ-ACK codebook configured for low priority with a DCI format type 1-2 indicating a low priority, the UE may determine the set of $K_1$ values based at least in part on information in a dl-DataToUL-ACK-ForDCIFormat1_2-r16 (rather than the union set of information in the dl-DataToUL-ACK for DCI format type 1-1 and information in the dl-DataToUL-ACK-ForDCIFormat1_2-r16 for DCI format type 1-2). The UE may similarly determine the set of $K_1$ values when the type-1 HARQ-ACK codebook is configured with a high priority indicator.

As another example, for a type-1 HARQ-ACK codebook configured for low priority with a DCI format type 1-1 indicating a low priority, the UE may determine candidate PDSCH occasions based at least in part on a union of a first set of row indices and a second set of row indices of a pdsch-TimeDomainAllocationList in a pdsch-Config (rather than determining the candidate PDSCH occasions based at least in part on the union set of the three sets of row indices in the manner described above). Similarly, for a type-1 HARQ-ACK codebook configured for low priority with a DCI format type 1-2 indicating a low priority, the UE may determine the candidate PDSCH occasions based at least in part on a union of a first set of row indices and a second set of row indices of a pdsch-TimeDomainAllocationList-ForDCIFormat1-2_r16 in a pdsch-Config (rather than determining the candidate PDSCH occasions based at least in part on the union set of the three sets of row indices in the manner described above). The UE may similarly determine the candidate PDSCH occasions when the type-1 HARQ-ACK codebook is configured with a high priority indicator.

As shown by reference 310, the UE may generate the HARQ-ACK codebook based at least in part on the set of parameters. For example, the UE may provide the set of parameters as an input to a HARQ-ACK codebook generation algorithm configured on the UE. Here, an output of the HARQ-ACK codebook generation algorithm may include the HARQ-ACK codebook for the particular DCI format associated with the particular priority.

As shown by reference 315, the UE may receive DCI of the particular DCI format, where the DCI schedules a PDSCH communication. As shown by reference 320, the UE may attempt to receive the PDSCH communication scheduled by the received DCI of the particular DCI format.

As shown by reference 325, the UE may transmit HARQ-ACK information, associated with the PDSCH communication, according to the HARQ-ACK codebook. For example, the UE may successfully decode the PDSCH communication and may transmit an ACK associated with the PDSCH communication, where one or more bits of the ACK are generated, transmitted, or mapped according to the HARQ-ACK codebook associated with the particular DCI format of the particular priority. As another example, the UE may fail to successfully decode the PDSCH communication and may transmit a NACK associated with the PDSCH communication, where one or more bits of the NACK are generated, transmitted, or mapped according to the HARQ-ACK codebook associated with the particular DCI format. In these examples, because the HARQ-ACK codebook used for the HARQ-ACK information was generated based on information associated with only the particular DCI format of the particular priority, a size of a HARQ-ACK payload may be reduced, thereby conserving network resources, conserving processing resource, and improving communication performance.

As indicated above, FIG. 3 is provided as an example. Other examples may differ from what is described with respect to FIG. 3.

Figure 4:
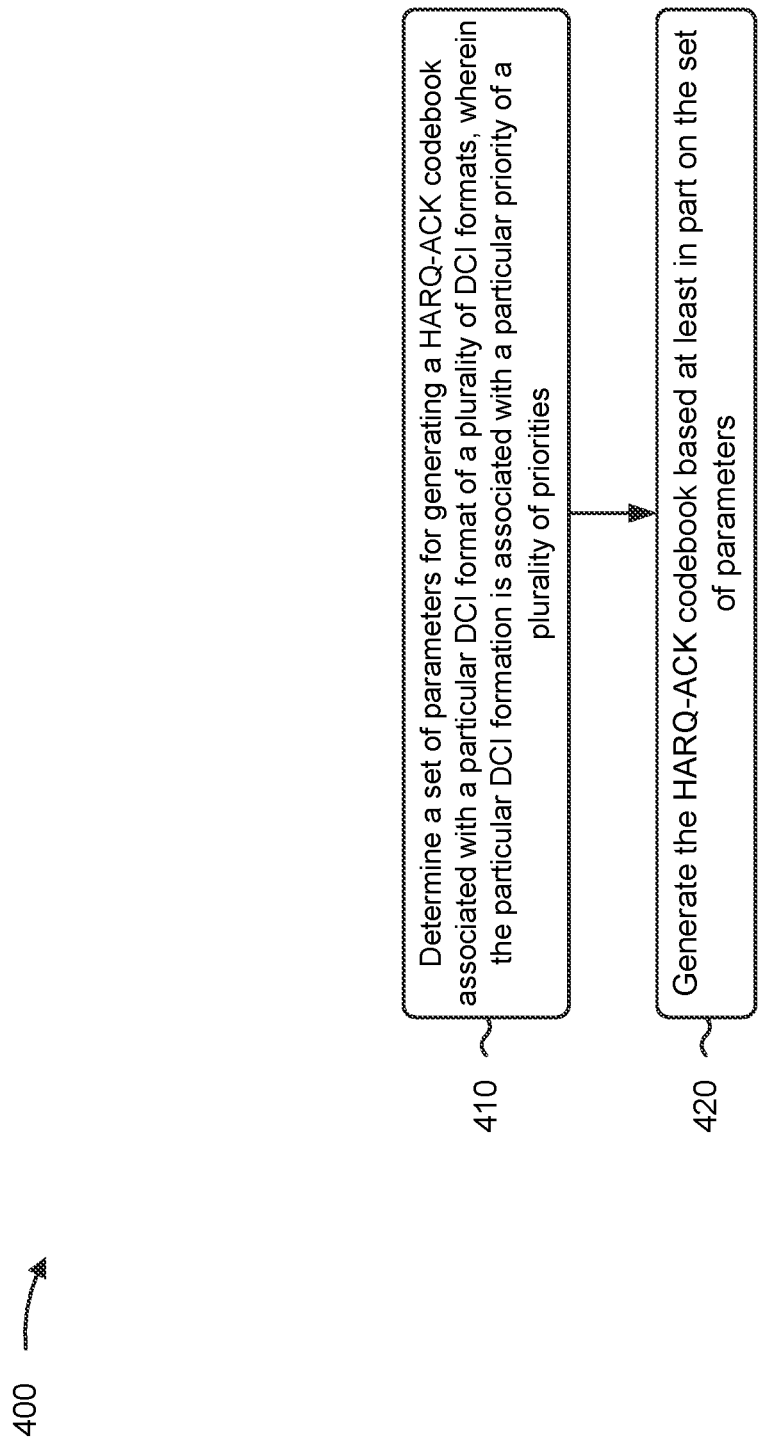
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120) performs operations associated with parameter determination for user equipment.

As shown in FIG. 4, in some aspects, process 400 may include determining a set of parameters for generating a HARQ-ACK codebook associated with a particular DCI format of a plurality of DCI formats, wherein the particular DCI format is associated with a particular priority of a plurality of priorities (block 410). For example, the UE (e.g., using receive processor 258, controller/processor 280, memory 282, and/or the like) may determine a set of parameters for generating a HARQ-ACK codebook associated with a particular DCI format of a plurality of DCI formats, wherein the particular DCI format is associated with a particular priority of a plurality of priorities, as described above.

As further shown in FIG. 4, in some aspects, process 400 may include generating the HARQ-ACK codebook based at least in part on the set of parameters (block 420). For example, the UE (e.g., using receive processor 258, controller/processor 280, memory 282, and/or the like) may generate the HARQ-ACK codebook based at least in part on the set of parameters, as described above.

Process 400 may include additional aspects, such as any single aspect or any combination of aspects described below and/or in connection with one or more other processes described elsewhere herein.

In a first aspect, process 400 includes receiving DCI scheduling a PDSCH communication, the DCI having the particular DCI format, and transmitting HARQ-ACK information, associated with the PDSCH communication, according to the HARQ-ACK codebook.

In a second aspect, alone or in combination with the first aspect, the set of parameters includes at least one of a time domain resource allocation, a set of PDSCH-to-HARQ timing indicator values, or a candidate PDSCH occasion timing.

In a third aspect, alone or in combination with one or more of the first and second aspects, the UE does not support dynamic change of priority with a single downlink control information.

In a fourth aspect, alone or in combination with one or more of the first through third aspects, the UE is configured to monitor a physical downlink control channel (PDCCH) with multiple DCI formats, and the particular DCI format is DCI format type 1-1, the particular priority is a low priority, and the set of parameters includes a set of PDSCH-to-HARQ timing indicator values configured based at least in part on a downlink data to uplink acknowledgement parameter.

In a fifth aspect, alone or in combination with one or more of the first through fourth aspects, the UE is configured to monitor a physical downlink control channel (PDCCH) with multiple DCI formats, and the particular DCI format is DCI format type 1-2, the particular priority is a low priority, and the set of parameters includes a set of PDSCH-to-HARQ timing indicator values configured based at least in part on a downlink data to uplink acknowledgement for DCI format type 1-2 parameter.

In a sixth aspect, alone or in combination with one or more of the first through fifth aspects, the UE is configured to monitor a physical downlink control channel (PDCCH) with multiple DCI formats, and the particular DCI format is DCI format type 1-1, the particular priority is a high priority, and the set of parameters includes a set of PDSCH-to-HARQ timing indicator values configured based at least in part on a downlink data to uplink acknowledgement parameter.

In a seventh aspect, alone or in combination with one or more of the first through sixth aspects, the UE is configured to monitor a physical downlink control channel (PDCCH) with multiple DCI formats, and the particular DCI format is DCI format type 1-2, the particular priority is a high priority, and the set of parameters includes a set of PDSCH-to-HARQ timing indicator values configured based at least in part on a downlink data to uplink acknowledgement for DCI format type 1-2 parameter.

In an eighth aspect, alone or in combination with one or more of the first through seventh aspects, the UE is configured to monitor a physical downlink control channel (PDCCH) with multiple DCI formats, and the particular DCI format is DCI format type 1-1, the particular priority is a low priority, and the set of parameters includes a set of row indices for PDSCH occasions that is a union of a first set of row indices and a second set of row indices of a PDSCH time domain allocation list message of a PDSCH configuration message.

In a ninth aspect, alone or in combination with one or more of the first through eighth aspects, the UE is configured to monitor a physical downlink control channel (PDCCH) with multiple DCI formats, and the particular DCI format is DCI format type 1-2, the particular priority is a low priority, and the set of parameters includes a set of row indices for PDSCH occasions that is a union of a first set of row indices and a second set of row indices of a PDSCH time domain allocation list for a DCI format type 1-2 message of a PDSCH configuration message.

In a tenth aspect, alone or in combination with one or more of the first through ninth aspects, the UE is configured to monitor a physical downlink control channel (PDCCH) with multiple DCI formats, and the particular DCI format is DCI format type 1-1, the particular priority is a high priority, and the set of parameters includes a set of row indices for PDSCH occasions that is a union of a first set of row indices and a second set of row indices of a PDSCH time domain allocation list message of a PDSCH configuration message.

In an eleventh aspect, alone or in combination with one or more of the first through tenth aspects, the UE is configured to monitor a physical downlink control channel (PDCCH) with multiple DCI formats, and the particular DCI format is DCI format type 1-2, the particular priority is a high priority, and the set of parameters includes a set of row indices for PDSCH occasions that is a union of a first set of row indices and a second set of row indices of a PDSCH time domain allocation list for a DCI format type 1-2 message of a PDSCH configuration message.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The following provides an overview of some Aspects of the present disclosure:

Aspect 1: A method of wireless communication performed by a user equipment (UE), comprising: determining a set of parameters for generating a hybrid automatic repeat request (HARD)-acknowledgement (ACK) codebook associated with a particular downlink control information (DCI) format of a plurality of DCI formats, wherein the particular DCI format is associated with a particular priority of a plurality of priorities; and generating the HARQ-ACK codebook based at least in part on the set of parameters.

Aspect 2: The method of Aspect 1, further comprising: receiving a downlink control information (DCI) scheduling a physical downlink shared channel (PDSCH) communication, the DCI having the particular DCI format; and transmitting HARQ-ACK information, associated with the PDSCH communication, according to the HARQ-ACK codebook.

Aspect 3: The method of any of Aspects 1-2, wherein the set of parameters includes at least one of a time domain resource allocation, a set of physical downlink shared channel (PDSCH-to-HARQ timing indicator values, or a candidate PDSCH occasion timing.

Aspect 4: The method of any of Aspects 1-3, wherein the UE is configured to monitor a PDCCH with multiple DCI formats, and the UE does not support dynamic change of priority with a single downlink control information.

Aspect 5: The method of any of Aspects 1-4, wherein the UE is configured to monitor a PDCCH with multiple DCI formats, and the particular DCI format is DCI format type 1-1, the particular priority is a low priority, and the set of parameters includes a set of physical downlink shared channel (PDSCH)-to-HARQ timing indicator values configured based at least in part on a downlink data to uplink acknowledgement parameter.

Aspect 6: The method of any of Aspects 1-4, wherein the UE is configured to monitor a PDCCH with multiple DCI formats, and the particular DCI format is DCI format type 1-2, the particular priority is a low priority, and the set of parameters includes a set of PDSCH-to-HARQ timing indicator values configured based at least in part on a downlink data to uplink acknowledgement for DCI format type 1-2 parameter.

Aspect 7: The method of any of Aspects 1-4, wherein the UE is configured to monitor a PDCCH with multiple DCI formats, and the particular DCI format is DCI format type 1-1, the particular priority is a high priority, and the set of parameters includes a set of physical downlink shared channel (PDSCH)-to-HARQ timing indicator values configured based at least in part on a downlink data to uplink acknowledgement parameter.

Aspect 8: The method of any of Aspects 1-4, wherein the UE is configured to monitor a PDCCH with multiple DCI formats, and the particular DCI format is DCI format type 1-2, the particular priority is a high priority, and the set of parameters includes a set of physical downlink shared channel (PDSCH)-to-HARQ timing indicator values configured based at least in part on a downlink data to uplink acknowledgement for DCI format type 1-2 parameter.

Aspect 9: The method of any of Aspects 1-5, wherein the UE is configured to monitor a PDCCH with multiple DCI formats, and the particular DCI format is DCI format type 1-1, the particular priority is a low priority, and the set of parameters includes a set of row indices for physical downlink shared channel (PDSCH) occasions that is a union of a first set of row indices and a second set of row indices of a PDSCH time domain allocation list message of a PDSCH configuration message.

Aspect 10: The method of any of Aspects 1-4 and 6, wherein the UE is configured to monitor a PDCCH with multiple DCI formats, and the particular DCI format is DCI format type 1-2, the particular priority is a low priority, and the set of parameters includes a set of row indices for physical downlink shared channel (PDSCH) occasions that is a union of a first set of row indices and a second set of row indices of a PDSCH time domain allocation list for a DCI format type 1-2 message of a PDSCH configuration message.

Aspect 11: The method of any of Aspects 1-4 and 7, wherein the UE is configured to monitor a PDCCH with multiple DCI formats, and the particular DCI format is DCI format type 1-1, the particular priority is a high priority, and the set of parameters includes a set of row indices for physical downlink shared channel (PDSCH) occasions that is a union of a first set of row indices and a second set of row indices of a PDSCH time domain allocation list message of a PDSCH configuration message.

Aspect 12: The method of any of Aspects 1-4 and 8, wherein the UE is configured to monitor a PDCCH with multiple DCI formats, and the particular DCI format is DCI format type 1-2, the particular priority is a high priority, and the set of parameters includes a set of row indices for physical downlink shared channel (PDSCH) occasions that is a union of a first set of row indices and a second set of row indices of a PDSCH time domain allocation list for a DCI format type 1-2 message of a PDSCH configuration message.

Aspect 13: An apparatus for wireless communication at a device, comprising a processor; memory coupled with the processor; and instructions stored in the memory and executable by the processor to cause the apparatus to perform the method of one or more Aspects of Aspects 1-12.

Aspect 14: A device for wireless communication, comprising a memory and one or more processors coupled to the memory, the memory and the one or more processors configured to perform the method of one or more Aspects of Aspects 1-12.

Aspect 15: An apparatus for wireless communication, comprising at least one means for performing the method of one or more Aspects of Aspects 1-12.

Aspect 16: A non-transitory computer-readable medium storing code for wireless communication, the code comprising instructions executable by a processor to perform the method of one or more Aspects of Aspects 1-12.

Aspect 17: A non-transitory computer-readable medium storing a set of instructions for wireless communication, the set of instructions comprising one or more instructions that, when executed by one or more processors of a device, cause the device to perform the method of one or more Aspects of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining a set of parameters for generating a hybrid automatic repeat request (HARQ)-acknowledgement (ACK) codebook, wherein a plurality of downlink control information (DCI) formats are associated with the HARQ-ACK codebook, wherein the HARQ-ACK codebook is associated with a particular priority of a plurality of priorities, and wherein the set of parameters is associated with a first set of parameters when a DCI format the UE is monitoring for is a first type and the particular priority is a low priority, or the set of parameters is associated with a second set of parameters when the DCI format is a second type and the particular priority is the low priority;
   generating the HARQ-ACK codebook based at least in part on the set of parameters and the particular priority; and
   transmitting HARQ-ACK information according to the generated HARQ-ACK codebook.

2. The method of claim 1, further comprising:
   receiving DCI scheduling a physical downlink shared channel (PDSCH) communication, the DCI having a particular DCI format of the plurality of DCI formats, wherein the HARQ-ACK information is associated with the PDSCH communication.

3. The method of claim 1, wherein the set of parameters includes at least one of a time domain resource allocation, a set of physical downlink shared channel (PDSCH)-to-HARQ timing indicator values, or a candidate PDSCH occasion timing.

4. The method of claim 1, wherein the first set of parameters includes a set of physical downlink shared channel (PDSCH)-to-HARQ timing indicator values configured based at least in part on a downlink data to uplink acknowledgement parameter.

5. The method of claim 1, wherein the second set of parameters includes a set of PDSCH-to-HARQ timing indicator values configured based at least in part on a downlink data to uplink acknowledgement for DCI format type 1-2 parameter.

6. The method of claim 1, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of physical downlink shared channel (PDSCH)-to-HARQ timing indicator values configured based at least in part on a downlink data to uplink acknowledgement parameter.

7. The method of claim 1, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-2, the particular priority is a high priority, and the set of parameters includes a set of physical downlink shared channel (PDSCH)-to-HARQ timing indicator values configured based at least in part on a downlink data to uplink acknowledgement for DCI format type 1-2 parameter.

8. The method of claim 1, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of row indices for physical downlink shared channel (PDSCH) occasions that is a union of a first set of row indices and a second set of row indices of a PDSCH time domain allocation list message of a PDSCH configuration message.

9. The method of claim 1, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-2, the particular priority is a high priority, and the set of parameters includes a set of row indices for physical downlink shared channel (PDSCH) occasions that is a union of a first set of row indices and a second set of row indices of a PDSCH time domain allocation list for a DCI format type 1-2 message of a PDSCH configuration message.

10. A user equipment (UE) for wireless communication, comprising:
a memory; and
one or more processors coupled to the memory, the one or more processors configured to:
determine a set of parameters for generating a hybrid automatic repeat request (HARQ)-acknowledgement (ACK) codebook, wherein a plurality of downlink control information (DCI) formats are associated with the HARQ-ACK codebook, wherein the HARQ-ACK codebook is associated with a particular priority of a plurality of priorities, and wherein the set of parameters is associated with a first set of parameters when a DCI format the UE is monitoring for is a first type and the particular priority is a low priority, or the set of parameters is associated with a second set of parameters when the DCI format is a second type and the particular priority is the low priority;
generate the HARQ-ACK codebook based at least in part on the set of parameters and the particular priority; and
transmit HARQ-ACK information according to the generated HARQ-ACK codebook.

11. The UE of claim 10, wherein the one or more processors are further configured to:
receive DCI scheduling a physical downlink shared channel (PDSCH) communication, the DCI having a particular DCI format of the plurality of DCI formats, wherein the HARQ-ACK information is associated with the PDSCH communication.

12. The UE of claim 10, wherein the set of parameters includes at least one of a time domain resource allocation, a set of physical downlink shared channel (PDSCH)-to-HARQ timing indicator values, or a candidate PDSCH occasion timing.

13. The UE of claim 10, wherein the first set of parameters includes a set of physical downlink shared channel (PDSCH)-to-HARQ timing indicator values configured based at least in part on a downlink data to uplink acknowledgement parameter.

14. The UE of claim 10, wherein the second set of parameters includes a set of physical downlink shared channel (PDSCH)-to-HARQ timing indicator values configured based at least in part on a downlink data to uplink acknowledgement for DCI format type 1-2 parameter.

15. The UE of claim 10, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of physical downlink shared channel (PDSCH)-to-HARQ timing indicator values configured based at least in part on a downlink data to uplink acknowledgement parameter.

16. The UE of claim 10, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-2, the particular priority is a high priority, and the set of parameters includes a set of physical downlink shared channel (PDSCH)-to-HARQ timing indicator values configured based at least in part on a downlink data to uplink acknowledgement for DCI format type 1-2 parameter.

17. The UE of claim 10, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of row indices for physical downlink shared channel (PDSCH) occasions that is a union of a first set of row indices and a second set of row indices of a PDSCH time domain allocation list message of a PDSCH configuration message.

18. The UE of claim 10, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-2, the particular priority is a high priority, and the set of parameters includes a set of row indices for physical downlink shared channel (PDSCH) occasions that is a union of a first set of row indices and a second set of row indices of a PDSCH time domain allocation list for a DCI format type 1-2 message of a PDSCH configuration message.

19. A non-transitory computer-readable medium storing a set of instructions for wireless communication, the set of instructions comprising:
one or more instructions that, when executed by one or more processors of a user equipment (UE), cause the UE to:
determine a set of parameters for generating a hybrid automatic repeat request (HARQ)-acknowledgement (ACK) codebook, wherein a plurality of downlink control information (DCI) formats are associated with the HARQ-ACK codebook, wherein the HARQ-ACK codebook is associated with a particular priority of a plurality of priorities, and wherein the set of parameters is associated with a first set of parameters when a DCI format the UE is monitoring for is a first type and the particular priority is a low priority, or the set of parameters is associated with a second set of parameters when the DCI format is a second type and the particular priority is the low priority;

generate the HARQ-ACK codebook based at least in part on the set of parameters and the particular priority; and transmit HARQ-ACK information according to the generated HARQ-ACK codebook.

20. The non-transitory computer-readable medium of claim 19, wherein the one or more instructions, when executed by the one or more processors, cause the UE further to:

receive DCI scheduling a physical downlink shared channel (PDSCH) communication, the DCI having a particular DCI format of the plurality of DCI formats, wherein the HARQ-ACK information is associated with the PDSCH communication.

21. The non-transitory computer-readable medium of claim 19, wherein the first set of parameters includes a set of PDSCH-to-HARQ timing indicator values configured based at least in part on a downlink data to uplink acknowledgement for DCI format type 1-2 parameter.

22. The non-transitory computer-readable medium of claim 19, wherein the UE is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of physical downlink shared channel (PDSCH)-to-HARQ timing indicator values configured based at least in part on a downlink data to uplink acknowledgement parameter.

23. The non-transitory computer-readable medium of claim 19, wherein the second set of parameters includes a set of physical downlink shared channel (PDSCH)-to-HARQ timing indicator values configured based at least in part on a downlink data to uplink acknowledgement for DCI format type 1-2 parameter.

24. An apparatus for wireless communication, comprising:

means for determining a set of parameters for generating a hybrid automatic repeat request (HARQ)-acknowledgement (ACK) codebook, wherein a plurality of downlink control information (DCI) formats are associated with the HARQ-ACK codebook, wherein the HARQ-ACK codebook is associated with a particular priority of a plurality of priorities, and wherein the set of parameters is associated with a first set of parameters when a DCI format the apparatus is monitoring for is a first type and the particular priority is a low priority, or the set of parameters is associated with a second set of parameters when the DCI format is a second type and the particular priority is the low priority;

means for generating the HARQ-ACK codebook based at least in part on the set of parameters and the particular priority; and means for transmitting HARQ-ACK information according to the generated HARQ-ACK codebook.

25. The apparatus of claim 24, further comprising:

means for receiving DCI scheduling a physical downlink shared channel (PDSCH) communication, the DCI having a particular DCI format of the plurality of DCI formats, wherein the HARQ-ACK information is associated with the PDSCH communication.

26. The apparatus of claim 24, wherein the second set of parameters includes a set of PDSCH-to-HARQ timing indicator values configured based at least in part on a downlink data to uplink acknowledgement for DCI format type 1-2 parameter.

27. The apparatus of claim 24, wherein the apparatus is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of physical downlink shared channel (PDSCH)-to-HARQ timing indicator values configured based at least in part on a downlink data to uplink acknowledgement parameter.

28. The apparatus of claim 24, wherein the first set of parameters includes at least one of a time domain resource allocation, a set of physical downlink shared channel (PDSCH)-to-HARQ timing indicator values, or a candidate PDSCH occasion timing.

29. The apparatus of claim 24, wherein the set of parameters is associated with a particular DCI format of the plurality of DCI formats.

30. The apparatus of claim 24, wherein the apparatus is configured to monitor a physical downlink control channel (PDCCH) with the plurality of DCI formats, and wherein the set of parameters is associated with a particular DCI format of the plurality of DCI formats, wherein the particular DCI format is DCI format type 1-1, the particular priority is a high priority, and the set of parameters includes a set of row indices for physical downlink shared channel (PDSCH) occasions that is a union of a first set of row indices and a second set of row indices of a PDSCH time domain allocation list message of a PDSCH configuration message.

* * * * *